May 28, 1968 H. V. MAY ET AL 3,385,426

LEAD PROTECTING STRUCTURE

Filed March 18, 1966

United States Patent Office 3,385,426

Patented May 28, 1968

3,385,426

LEAD PROTECTING STRUCTURE

Harold V. May, Pittsfield, William G. Seeley, Williamstown, and Noel C. Sears, Dalton, Mass., assignors to Sprague Electric Company, North Adams, Mass., a corporation of Massachusetts Filed Mar. 18, 1966, Ser. No. 535,549
3 Claims. (Cl. 206—46)

ABSTRACT OF THE DISCLOSURE

A circuit module is retained between laminations of insulating films with at least one face of the module exposed for manufacturing and testing procedures. The plurality of leads extending from both ends of the module are protected by extending legs of the laminations at least the length of the leads. The laminations are cut back between the extended legs to expose the ends of the leads for testing.

This invention relates to a lead protecting structure for electrical components and in particular to a lead protecting structure for electronic modules of the type having leads extending from the perimeter in coplanar arrangement.

In the present state of the microcircuit art, the interconnection between modules and other circuit portions is generally provided by thin fragile leads which extend from the wafer. The small size of the module and the fragile nature of the leads, as well as their extended position makes them quite susceptible to damage, ranging from misalignment to fracture, or severance of the lead. This susceptibility continues, throughout manufacturing and test, from the time of the leads are affixed to the chip until the microcircuit is permanently installed in the overall circuit.

It is an object of this invention to provide a lead protecting structure which permits testing and completion of a microcircuit, while the lead protecting structure remains in position.

It is a further object of this invention to provide a structure which protects and maintains the leads of a microcircuit module until just prior to or just after its installation in a circuit, at which time the protecting structure may be easily removed.

It is a still further object of this invention to provide an economical structure which protects and maintains the leads throughout various phases of module life such as manufacturing, testing, shipping, customer testing and in some cases installation of the microcircuit module.

It is a still further object of the invention to provide a lead protecting structure which also provides a carrier strip for a plurality of modules.

These and other objects of the invention will be apparent from the following description taken in conjunction with the drawing, in which.

Figures 1, 2, 3, 4:
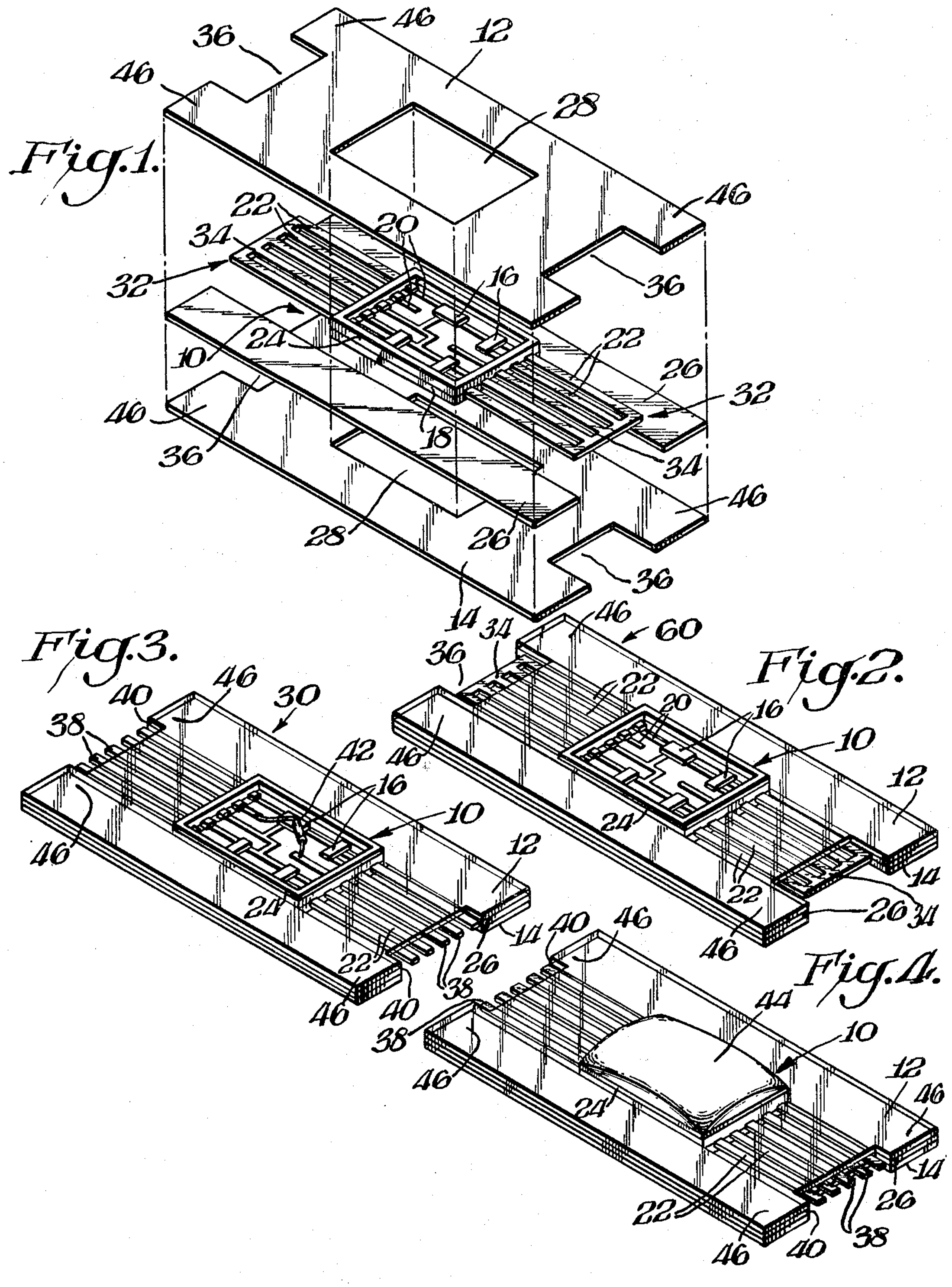
FIGURE 1 is an exploded view in perspective of components which may be utilized in one embodiment of the invention.
FIGURE 2 is a perspective view of the assembled components of FIGURE 1.
FIGURE 3 is a perspective view of the assembly of FIGURE 2 illustrating the completed lead support structure and the addition of further electrical components to the microcircuit.
FIGURE 4 is a perspective view of a completed encapsulated microcircuit provided with the novel lead support structure.

Basically, a lead protecting structure provided in accordance with the invention comprises a member of insulating material which accommodates a circuit module and encloses and supports its extended leads. The leads are exposed at their ends permitting contact thereto for electrical testing of said module within the member and a bifurcated portion of the member extends to at least the end of the leads.

In a more limited sense, the structure provides a laminated body comprising an upper and lower film of insulating process resistant material which sandwiches the leads. An aperture is provided within at least one of the films to receive and engage the periphery of the module and to provide module access means permitting manufacturing of the module within the member. Indentations are provided in the films at the ends of the leads to form a bifurcated portion alongside the leads while exposing them at their ends for electrical test.

A lead protecting structure providing a carrier strip for a plurality of modules is produced in accordance with the invention by a side by side or end to end connection of members in the form of a strip which permits continuous manufacturing and processing of a succession of modules.

Referring now to the figures and in particular to FIGURE 1 wherein elements suitable for construction of a preferred embodiment of the invention are shown, a partially completed electronic module 10 is positioned between an upper and lower film 12, 14 of insulating material.

In this embodiment module 10, which may be any suitable electric unit having extended leads, is a rectangular ceramic-based module in which thin film elements 16, such as resistors and capacitors etc., are provided upon a chip or wafer 18 of aluminum oxide or the like in connection to conductors 20, which in turn provide electrical connection to extended leads 22. The module body is completed by a frame 24, which overlies and conforms to the perimeter of wafer 18 thereby protecting elements 16 and facilitating the later completion of the unit by encapsulation.

The leads 22, which are part of a semifinished piece 32, are enclosed and supported by a sandwich structure 30, as illustrated in FIGURE 2. The leads 22 are joined at their extended ends by a strip 34, which supports the leads during their installation in module 10. As indicated, the leads are quite fragile, for example 0.004 inch thick Kovar is commonly employed, so that they are misaligned, bent and fractured quite easily. Thus even relatively thin films of flexible material, such as 0.0075 inch thick polyethyleneterephthalate or the like, will provide considerable protection in the sandwich construction 30, since it exposes only a small portion of the leads, prevents shock of them and considerably increases the bend radius which the leads may be subject to.

Accordingly, a sandwich structure 30, illustrated in FIGURE 2, is constructed with films 12, 14 and filler strips or spacers 26, which have approximately the same thickness as leads 22 and are positioned alongside them to space films 12, 14 and bond them together. Module receiving apertures 28 are provided in each film 12, 14 to allow them to lie flat on leads 22 and strips 26, as well as to engage the perimeter of module 10. Of course, upper film 12 in this embodiment engages the perimeter of frame 24 while lower film 14 engages wafer 18.

A pair of indentations 36, are provided at the end of each film to expose a portion of leads 22 and permit electrical testing of the module. This provides a bifurcated portion 46 extending to or beyond the end of the leads to protect their exposed ends. The module is made ready for test by removing strip 34, leaving an exposed lead portion 38 as shown in FIGURE 3. In this case, the sandwich is cut through the bifurcated legs 46 allowing a portion of them to remain at each end of structure 30. It should also be understood, however, that strip 34 could be severed from leads 22 without cutting the bifurcated portions 46 so as to allow them to extend beyond the severed ends of leads 22. The removal of only strip 34 would of course be employed for members connected in end to end arrangement as a carrier strip.

The completed support structure 30, as illustrated in FIGURE 3, permits continued manufacturing, processing and testing as well as shipping of the unit while the leads are enclosed and protected. Additionally, it also permits tests by the customer while the leads are still protected.

For example, once connecting strip 34 has been severed from leads 22, the module may be electrically tested to evaluate both the lead connections to the circuit module and the module circuit. Thereafter discrete component 42 such as a resistor, capacitor, inductor, diode, or the like, may be connected in the module as illustrated in FIGURE 3, and the unit again tested. Subsequent additions, repairs and tests may be also made in the circuit while the support structure 30 remains in place.

A suitable potting material 44 may then be introduced into the open frame 24 to encapsulate the exposed circuitry and components and provide a finished package as shown in FIGURE 4. Thereafter, further testing, including environmental tests, and other manufacturing techniques such as high temperature "burn in" or the like may be conducted while the support structure 30 remains in position. It should be noted, however, that the material of sandwich 30 must be process resistant, that it must be suitable to withstand processing and testing procedures such as the temperature and moisture etc. developed during environmental tests.

Thus, for example, polyethyleneterephthalate is preferred for films 12, 14 since this provides excellent electrical insulation, also withstands the operating temperatures during "burn in" and other tests and is suitable for use in strip form for continuous processing of successive devices. The transparent characteristic of this material also allows visible inspection of the leads throughout manufacturing. Many other materials, however, such as cellulose acetate, or polyvinyl, or the like, are also suitable.

Similar materials may also be employed for strips 26, although these do not have to be of insulating material as long as they do not contact leads 22. Thus various materials will be suitable as long as they are capable of being bonded to the sheets 12, 14 and may withstand the indicated manufacturing procedures. For example, double-sided pressure sensitive adhesive strips may be utilized. In addition, thermal bonding or heat sealing may be employed by utilizing various thermoplastics such as polyethyleneterephthalate, or the like, for both strips 26 and the layers 12, 14.

Similarly strips 26 may be eliminated and the top layer 12 bonded directly to a bottom layer 14 by heat sealing the layers together, or by other suitable means. In this case, however, care must be taken that the leads 22 are not placed under undue strain due to the direct bonding of films.

As indicated above, the support structure or sandwich 30 is employed to support and protect the leads throughout manufacturing, processing and test, and continues this during shipping and customer tests, after which it is easily removed by cutting through both edges to the module apertures 28 and sliding the separated ends of sandwich 30 from either end of the module.

The structure may also be employed as a carrier by providing one or both films 12, 14 in the form of a strip of tape having a series of apertures 28 and indentations 36, or the like. For example, one continuous strip not shown could be employed to replace one of the illustrated films. Each module could be fitted to a strip and sealed to it by individual films. Similarly, two continuous strips could be employed with matching apertures and indentations. In this way modules could be provided having their leads extended across, or along the length of the strip.

Many different modifications are possible. For example, the films or carrier strips may be molded before installation, or during the sandwich construction, to fit between individual leads and thereby provide further alignment of them. Various degrees of stiffness may also be employed for the films or filler strips to make the lead support structure more rigid. In addition, the insulating member 30 need not always engage the perimeter of module 10 but merely accommodate it. Furthermore, each film or carrier tape may be quite distinct from one another. Thus a module receiving aperture 28 need only be carried on the top film when further manufacturing is anticipated since the films may be molded over, or force to accommodate the module by heating or the like. Obviously, in some embodiments aperture 28 may be unnecessary in either layer.

Similarly, test openings are required in only one layer, although to insure good contact, access from both top and bottom of the sandwich is preferred. Furthermore, although the protecting structure is illustrated with regard to a module having coplanar leads extended from opposite ends, it may also be employed with leads from only one end or from all four edges of the module. In the latter case, the sandwich may be sealed between the leads, or for a rectangular module it could be sealed at the four corners between the lead clusters.

Generally, a coplanar lead arrangement is preferred, however, the protecting sandwich may also be employed for modules where individual leads of each cluster are coplanar but the clusters themselves are not. For example, if the illustrated module also included in a lead cluster at substantially a right angle to those shown, the protecting structure could be modified accordingly to similarly protect them. In addition, the protective structure may also be suitable for modules having only portions of the leads coplanar, for example, where the leads extend a short distance in coplanar arrangement and then continue at an angle to the original plane of the leads. In such cases, the structure can be employed to at least confine the coplanar portions, and could be molded to conform to lead bends to generally protect them while allowing processing and testing to continue.

Various types of modular units may be employed. For example, the module may be trianagular or even circular. In addition, the circuit chip and the frame need not be identical in shape and size in order to practice the invention.

Thus many different modifications of the invention are possible without departing from the spirit and scope thereof and it should be understood that the invention is not to be limited except as defined in the appended claims.

What is claimed is:

1. A lead protecting structure comprising a circuit module retained between laminations of process resistant insulating films, at least one face of said module exposed through an opening in said laminations, a plurality of leads extending from said module between said laminations, said laminations being terminated in bifurcated portions of said laminations extending to at least the ends of said leads, the ends of said leads being exposed between said bifurcated portions, whereby access is available to said module and said leads within said structure for manufacturing and testing procedures.

2. A structure as claimed in claim 1 wherein said laminations are joined in a strip carrier linking a plurality of said modules.

3. A structure as claimed in claim 1 including a plurality of filler strips interposed between said insulating films adjacent said leads to space said films under and over said leads.

References Cited

UNITED STATES PATENTS

| | | | |
|---|---|---|---|
| 2,761,557 | 9/1956 | McLean | 206—80 |
| 3,198,329 | 8/1965 | Golenpaul et al. | 206—65 |
| 3,216,089 | 11/1965 | Dettman | 206—56 |
| 3,256,982 | 6/1966 | Kisor | 206—65 |
| 3,278,018 | 10/1966 | Ishler et al. | 206—56 |
| 3,297,974 | 1/1967 | Pittman | 339—17 |
| 3,168,617 | 2/1965 | Richter | 174—117 |
| 3,239,916 | 3/1966 | Love | 174—117.11 |

WILLIAM T. DIXSON, Jr., *Primary Examiner.*